Sept. 24, 1963   A. BOLENBACH   3,104,693
RUBBER TIRE TREAD GROOVES AND PATTERNS
Filed Jan. 25, 1960
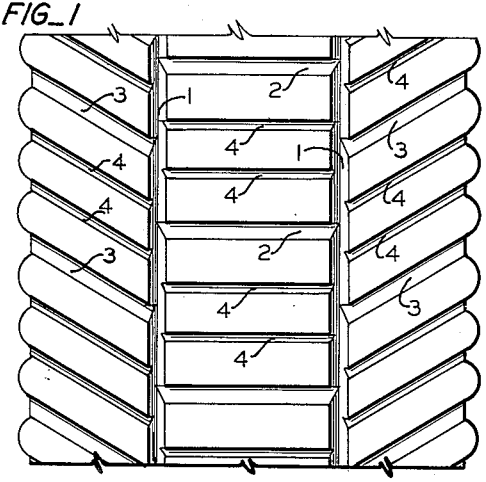
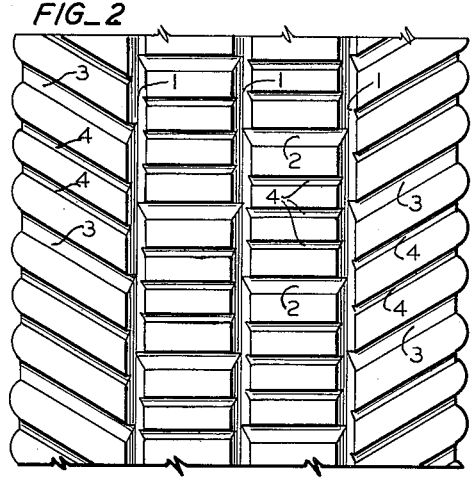
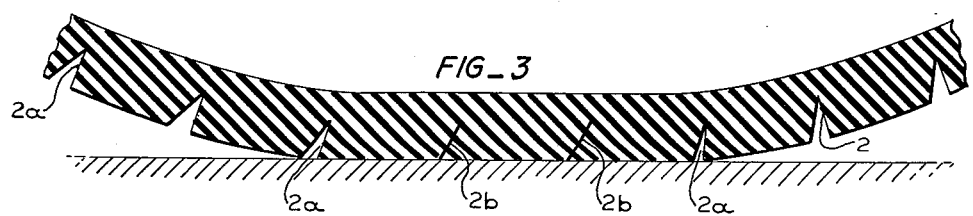
INVENTOR.
Adolf Bolenbach 3,104,693
RUBBER TIRE TREAD GROOVES AND
PATTERNS
Adolf Bolenbach, 12630 Gail Ave., Sunnyvale, Calif.
Filed Jan. 25, 1960, Ser. No. 4,577
3 Claims. (Cl. 152—209)

This invention relates to improved rubber tire tread grooves and patterns for use on motor vehicles and the like.

Objects of the improvements are as follows:

The many large circular V, rectangle and zig zag grooves on today's tire treads are relics of the good old dirt roads when the large lugs and ridges would go down into the earth which would obligingly reciprocate and come up into the deep grooves. Now however, the tire has to knuckle to the road and fit into its minor irregularities and pores. When the road was rough with rocks, bumps and ridges, the inflated tire would fit itself, with the help of big grooves, over these obstructions and obtain real traction and stability. The air in the tire still takes care of the minor ups and downs on the modern road, but now no large grooves are needed to help a tire adapt itself to minor ups and downs and the flattening of the tire when under pressure on the road. But these minor ups and downs do not produce enough traction unless the hard smooth surface of the tread rubber is broken up by more medium grooves and still smaller grooves between them so that every part of the tread and grooves can be squeezed into the pores of the road when under the flattened, more or less, part of the tire under pressure on the road. Hence every groove or part of it that does not close completely and firmly when it rolls under pressure, or if it retains water, slush, soft mud, soft snow or even air prevents the rubber to contact the road and grip it for more traction and stability, and thus cause more spinning, slipping and skidding. But the V grooves never can close completely, its sides can never get together at the top and the sides of the rectangle groove can never close at the bottom. They cup right over the water, air etc. and hold it on the road under pressure then leave it in front of the rear tire for more trouble.

To get a much needed groove that will close completely and firmly for my tread, I crossed the V groove with the rectangle groove, took one vertical side of the latter and joined it with one slanting side of the former, resulting in the V groove, and when placed in a position on the tread so that the vertical side of this V groove contacts the road first, it is squeezed by the forward pressure of the rubber against the slanting side and closes completely and firmly and free from water etc. as it rolls under the pressure of the load on the road.

The many big circular grooves are supposed to be very helpful to prevent skidding but since they do not completely close and pick up water, air etc. and hold it on the road and since the edges of grooves do not grip the road firmly because they are more or less flabby, especially the corners, therefore only two to three circular grooves are helpful, even if the V grooves are used.

Since the pressure on the rubber causes a limited forward squeeze or expansion of the rubber as it can not go backwards under the pressure of the load, cross V grooves would close more firmly than circular grooves, as they will press into the pores of the road, especially since these cross grooves are placed in the center part of the tread where pressure is greatest.

Using only two circular V grooves the tread is divided into a center section and two outer sections. Cross grooves, straight, evenly spaced connect at right angles with the circular grooves. In the outer sections the grooves start on the circular grooves, slanting outward in a direction so they will point outward and forward when they contact the road and when they come under pressure, water, slush and even the air is squeezed out and away from the tire for a dryer road as they close completely and firmly for better traction and stability.

The drawing:

FIG. 1 is a front view of an upper front tire tread section, two circular grooves and cross and slanting grooves.

FIG. 2 is a front view showing a three circular groove pattern, cross and slanting grooves.

FIG. 3 is a cut thru the cross grooves showing the V grooves in action of FIGS. 1 and 2.

In FIG. 1 is shown a section of a rubber tire tread, the two circular parallel straight split V grooves divide the tread into a center and two outer sections. In the center we have the novel cross grooves 2, in the outer sections we have the slanting grooves 3, all V grooves are of the same size, parallel to each other evenly spaced, all with open ends so water, slush and hot air in the summer in any of the grooves can be forced out to the sides of the tires when the grooves are firmly closed under pressure, described when the shape of this novel V groove was explained and that the vertical sides of the V grooves are so placed that as they contact the road first and are squeezed against their slanting sides, and since the slanting grooves are slanted outward in a direction so they will point outward and forward as they contact the road, water etc. is forcibly squeezed away from the tread as it goes under pressure. In addition to the clearance of water etc. on wet roads and the clearance of the grooves from hot air in the summer, both the novel slanting and cross grooves, each acting as a unified pattern, produce greater traction and stability. The small grooves 4 preferably parallel to and about half the size of the main grooves, are essential for a close grip of the spaces they occupy, and for ornamental reason, could be wavy and run in other directions. They also should be V grooves.

FIG. 2 is a minor variation of FIG. 1 adapted for larger tires by means of a third circular groove 1, splitting the center section into two parts, each with cross grooves 2, connecting at right angles with the center groove and an outer groove. The outer slanting grooves 3 connect with the circular grooves at points half way between the ends of the cross grooves 2 as in FIG. 1, functions, grouping, directions being the same as in FIG. 1.

FIG. 3 is a lengthwise cut through a section of the tread and thru and across the cross V grooves in the center of the tread and shows two V grooves 2a before they go under the pressure flattened part of the tire, groove 2b has its vertical side going under pressure and being squeezed toward the slanting side, two grooves 2c are closed under pressure and other grooves are shown out of the pressure.

I claim:

1. A tire having a rubber tread surface, an endless series of transverse grooves in said surface, said grooves being V-shaped in cross section with the open end radially outward, one surface of each groove extending radially outward, the angular relationship between the sides of the grooves and the direction of rotation being such that as the tread contacts the ground surface during rotation, the edges of the grooves adjacent the radial surface strike first, causing the grooves to close firmly to thereby clear water and slush from the tread.

2. The tire of claim 1 wherein the tread is longitudinally divided into a plurality of substantially equal parts by longitudinally extending V-shaped grooves with one radial side.

3. The tire of claim 2 wherein the transverse grooves between said longitudinal grooves extend at right angles to the longitudinal center line and the angular grooves axially outward of said longitudinal grooves extend at equal and opposite acute angles to said center line and in a forward direction with respect to tire rotation.

References Cited in the file of this patent
UNITED STATES PATENTS

| | | |
|---|---|---|
| D. 67,669 | Merriman | June 23, 1925 |
| 1,522,448 | Harig | Jan 6, 1925 |
| 2,240,542 | Bourdon | May 6, 1941 |
| 2,403,309 | Smith | July 2, 1946 |
| 2,716,435 | Herzegh | Aug. 30, 1955 |
| 2,770,279 | Harrison | Nov. 13, 1956 |

FOREIGN PATENTS

| | | |
|---|---|---|
| 460,338 | Great Britain | Jan. 26, 1937 |